(12) United States Patent
Borden et al.

(10) Patent No.: US 7,098,912 B1
(45) Date of Patent: Aug. 29, 2006

(54) METHOD OF MODIFYING A VOLUME MESH USING SHEET INSERTION

(75) Inventors: Michael J. Borden, Albuquerque, NM (US); Jason F. Shepherd, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 308 days.

(21) Appl. No.: 10/601,896

(22) Filed: Jun. 23, 2003

Related U.S. Application Data

(60) Provisional application No. 60/390,957, filed on Jun. 24, 2002.

(51) Int. Cl.
*G06T 15/30* (2006.01)
(52) U.S. Cl. .................... 345/423; 345/421; 345/424
(58) Field of Classification Search ................ 345/421, 345/423, 424, 419
See application file for complete search history.

(56) References Cited

U.S. PATENT DOCUMENTS 5,768,156 A    6/1998   Tautges et al.

OTHER PUBLICATIONS

Hannerman "Improving the Surface Cycle Structure for Hexahedral Mesh generation", ACM 2000, pp. 19-28.*

* cited by examiner

*Primary Examiner*—Kimbinh T. Nguyen
(74) *Attorney, Agent, or Firm*—Birch, Stewart, Kolasch & Birch; Madelynne J. Farber

(57) ABSTRACT

A method and machine-readable medium provide a technique to modify a hexahedral finite element volume mesh using dual generation and sheet insertion. After generating a dual of a volume stack (mesh), a predetermined algorithm may be followed to modify (refine) the volume mesh of hexahedral elements. The predetermined algorithm may include the steps of locating a sheet of hexahedral mesh elements, determining a plurality of hexahedral elements within the sheet to refine, shrinking the plurality of elements, and inserting a new sheet of hexahedral elements adjacently to modify the volume mesh. Additionally, another predetermined algorithm using mesh cutting may be followed to modify a volume mesh.

28 Claims, 13 Drawing Sheets

100

115

500

500

538

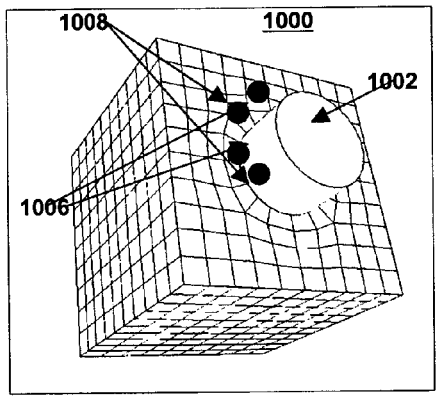
FIG. 10C
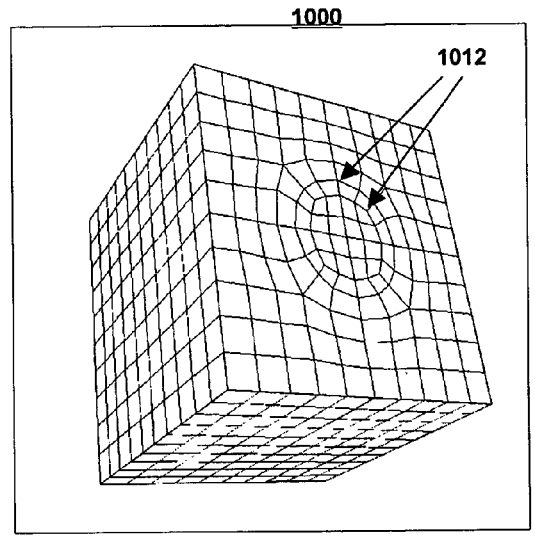
FIG. 10D
FIG. 10E
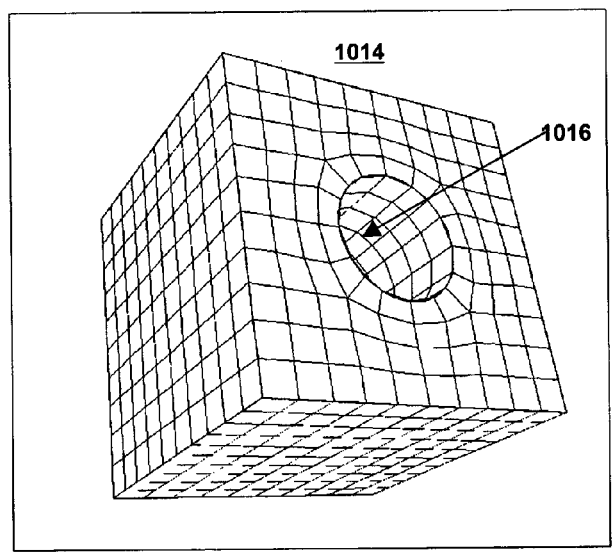

FIG. 12C
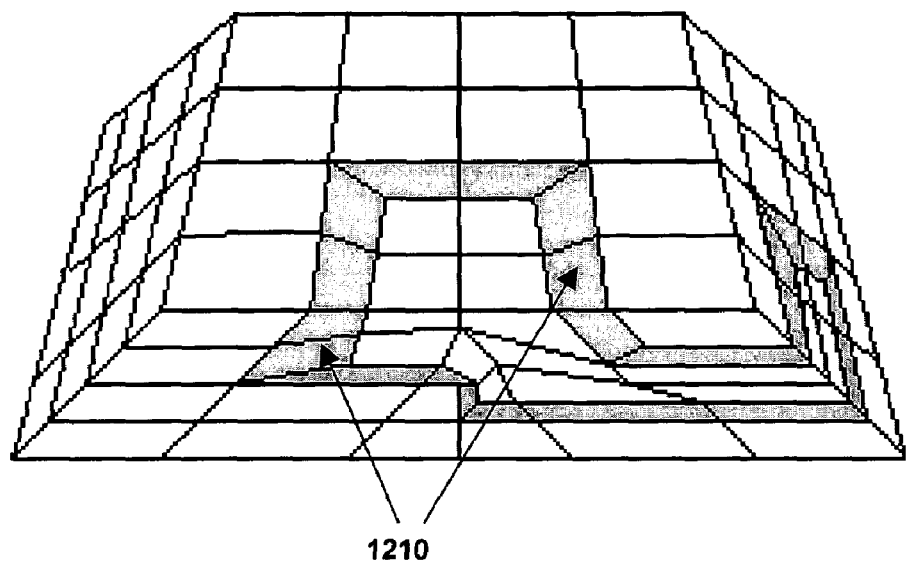
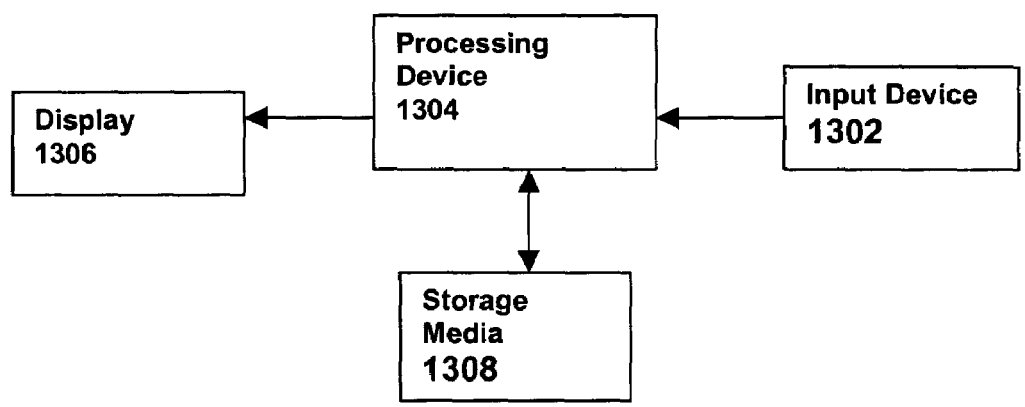
FIG. 13

METHOD OF MODIFYING A VOLUME MESH USING SHEET INSERTION

CROSS-REFERENCE

This application claims the benefit of U.S. provisional application Ser. No. 60/390,957, filed Jun. 24, 2002.

The U.S. Government has rights in this invention pursuant to Department of Energy Contract DE-AC94AL-85000 with Sandia Corporation.

TECHNICAL FIELD

The present invention relates generally to computer modeling of physical systems. It particularly relates to computer modeling allowing modification of a finite element volume mesh using dual generation and sheet insertion.

BACKGROUND OF THE INVENTION

With the advancement of computer technologies and understanding of basic physical phenomena or systems (e.g., engine operation, fluid flow, heat transfer, structural stress and strain analysis, etc.), three-dimensional (3D) computer simulation has become more of an important feature in physical system development, analysis, and evaluation. The computer simulation (modeling) often involves the building of a finite element mesh (collection of discrete set of points defined as nodes) to model the physical system. The accuracy of finite element mesh generation is related to the geometric complexity (including representing the physical system by a set of mathematical equations) of the physical system including the number of finite elements in the mesh, the order of those elements, and the quality of those finite elements.

A number of mesh-generating algorithms (e.g., parametric mapping, Dicer algorithm, Paving algorithm, Whisker-Weaving algorithm, sweeping algorithm, etc.) have been developed to attempt to generate high-quality meshes (including volume meshes) with greater accuracy and reduced user interaction for generating the mesh. However, each algorithm has its own set of strengths and weaknesses, and therefore may only be suitable for a particular geometry while being ineffective for another. Therefore, there is still a need to generate high-quality meshes for all types of geometry, including hexahedral volume meshes, that are robust, accurate, and reduce user interaction time. Additionally, modification of a volume (3D) mesh is an important feature to improving mesh quality by allowing insertion of additional elements (e.g., introduce new elements to form a more complex geometry) into the mesh to generate a more detailed volume mesh and more accurate and faster analysis results.

As described herein, the generation of a dual (for a volume mesh) within a dual space may be an effective tool for producing a high-quality volume mesh for three-dimensional elements (objects) by providing an alternative geometric representation of the volume mesh and more clearly defining global connectivity constraints for the mesh. Advantageously, the dual of a mesh may be generated, edited, and then converted back to a volume mesh to improve analysis results. It is noted that terms used within the specification, in accordance with embodiments of the present invention, will be defined within the specification and further definition may be found within the Glossary of Terms in Appendix A. FIGS. 1A, 1B illustrate the process for generating a dual of a 3D element as found in the prior art. FIG. 1A shows a stack (column) 100 of 3D elements (mesh) in primal space (e.g., hexahedral elements). Each hexahedral element of the stack 100 includes six quadrilateral faces 108 and eight nodes 110 formed from three edges 112. It is noted that stack 100 may form the complete volume mesh. A dual 115 of the volume elements (mesh) 100 may be generated by connecting opposing faces of a hexahedral element using a (volume) chord 102 (see Appendix A for glossary of terms) as shown in FIG. 1B. As shown in FIG. 1B, chord 102 (a dual volume chord) connects the opposite edges for a stack of hexahedral elements 114, 116, 118, 120. In the dual space generated, chord 102 is equivalent (the dual) to the row of hexahedral elements 114, 116, 118, 120 in the primal space.

The generation of the dual may continue as shown in FIG. 1B as more opposite faces of the hexahedral elements 114, 116, 118, 120 are connected using further chords (e.g., 101, 103, 105, 107, 109). The chords are generated with adherence to the following rules: 1) a chord that begins on a boundary must terminate on the boundary, or 2) a chord may form an internal closed loop.

To help complete the dual 115, a twist plane 202 may be generated as shown in FIG. 2A (from the prior art) that carries a chord 102 along an intersecting edge. The twist plane 202 may be a continuous, three-dimensional surface which adheres to the following rule: twist planes may be nowhere tangent or coplanar. FIG. 2A found in the prior art shows three intersecting twist planes 202, 204, 206 that define a 3D cell region (hexahedral element) 208. Three-dimensional (3D) cell region 208 may be defined as an n-sided polyhedron with the faces formed by individual twist planes 202, 204, 206 that carry (formed from) chords 102, 101, 109, respectively (see glossary in Appendix A). As shown in FIG. 2B from the prior art, a centroid 216 may be formed from the three intersecting chords 101, 102, 109 generated from the intersecting twist planes 202, 204, 206 where the intersecting chords include one 3D cell region (hexahedral element) 208. FIG. 3 found in the prior art shows a twist plane 302 in a hexahedral mesh 300 that may be used to generate a sheet of hexahedral mesh elements for extraction to modify the mesh 300. As shown in FIG. 2B, every 3D cell region 208 includes a single node (e.g., node 210) from the original stack 100. Cell region 208 is equivalent (the dual) to node 210 within the dual space generated. Also, centroid 216 is equivalent (the dual) to hexahedral element 114 within the dual space generated. Also, Table 1 in Appendix B shows the relationship between the original surface elements and dual entities in three dimensions.

Therefore, due to the disadvantages of current volume meshing algorithms, there is a need to provide a computer modeling technique that uses duals to modify hexahedral volume meshes while maintaining accuracy, reduced user interaction time, and high quality of the resulting meshes to generate a more detailed hexahedral volume mesh.

SUMMARY OF THE INVENTION

The method and machine-readable medium of the present invention overcome the previously mentioned problems by providing a technique to modify a hexahedral finite element volume mesh using dual generation and sheet insertion. After generating a mesh of the volume, a predetermined algorithm may be followed to modify (refine) the volume mesh of hexahedral elements. The predetermined algorithm may include the steps of locating a sheet of hexahedral mesh elements, determining a plurality of hexahedral elements within the sheet to refine, shrinking the plurality of elements, and inserting a new sheet of hexahedral elements adjacently to modify the volume mesh. Additional features of the invention include using a mesh cutting technique to modify a volume mesh.

BRIEF DESCRIPTION OF THE DRAWINGS

FIG. 10C is a block diagram of an exemplary volume inserted into an existing volume mesh with nodes moved to the surface of the intersection in accordance with embodiments of the present invention.

FIG. 10D is a block diagram of a modified volume mesh with an exemplary volume removed after insertion in accordance with embodiments of the present invention.

FIG. 10E is a block diagram of an exemplary modified volume mesh after mush cutting in accordance with embodiments of the present invention.

FIGS. 12A–12C are block diagrams showing exemplary performance of transition path refinement in accordance with embodiments of the present invention.

FIG. 13 is a block diagram of an exemplary system performing volume mesh modification in accordance with embodiments of the present invention.

DETAILED DESCRIPTION

Figure 1A:
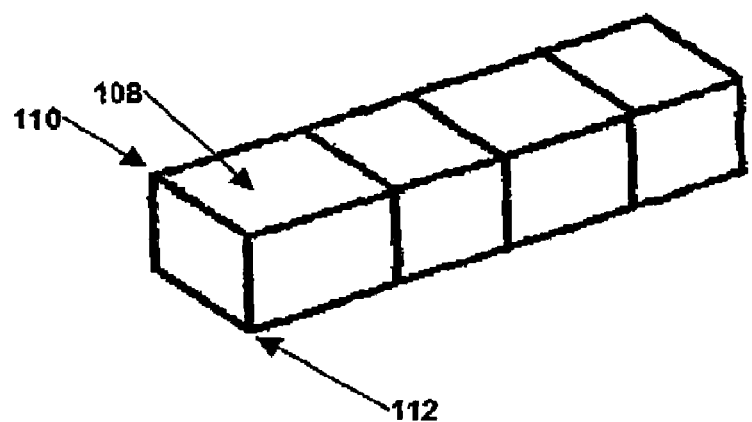
FIG. 1A is a block diagram of exemplary volume elements found in the prior art.
Figure 1B:
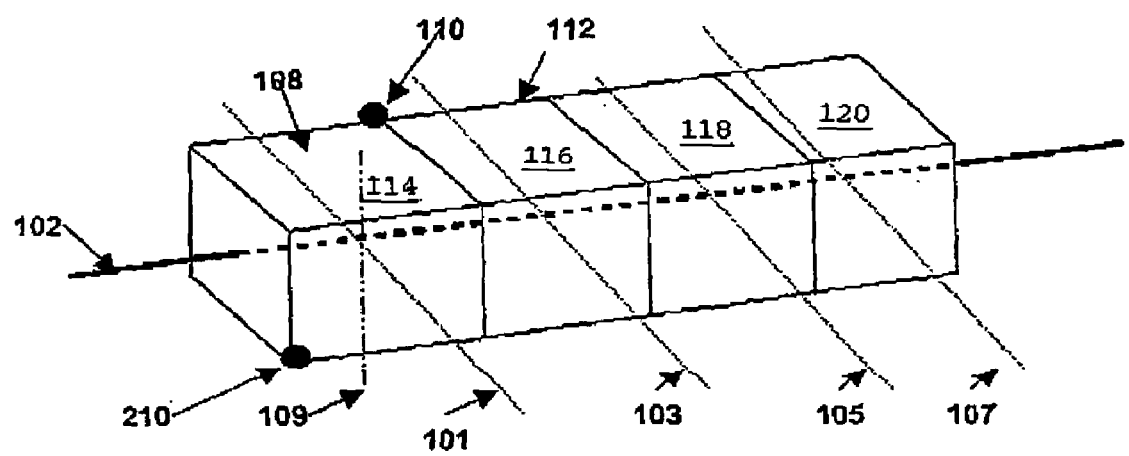
FIG. 1B is a block diagram of exemplary dual generation found in the prior art.
Figure 2A:
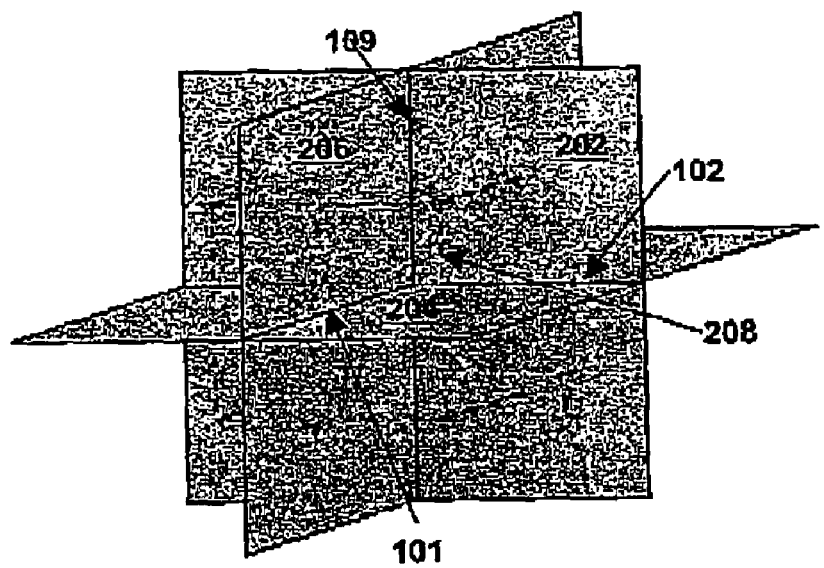
FIG. 2A is a block diagram of an exemplary dual of a volume element generated using twist planes found in the prior art.
Figure 2B:
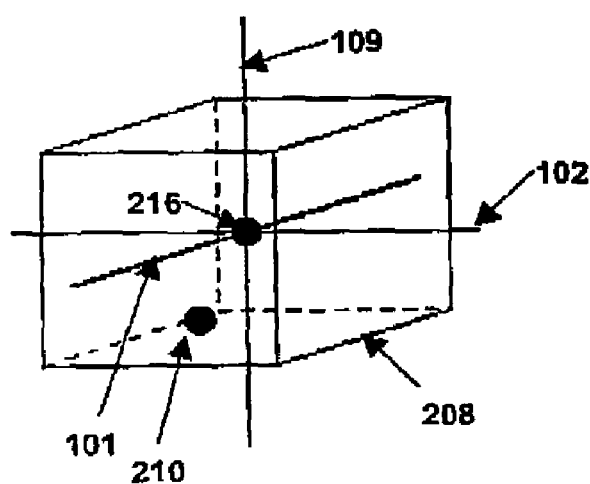
FIG. 2B is a block diagram of exemplary generated dual elements found in the prior art.
Figure 3:
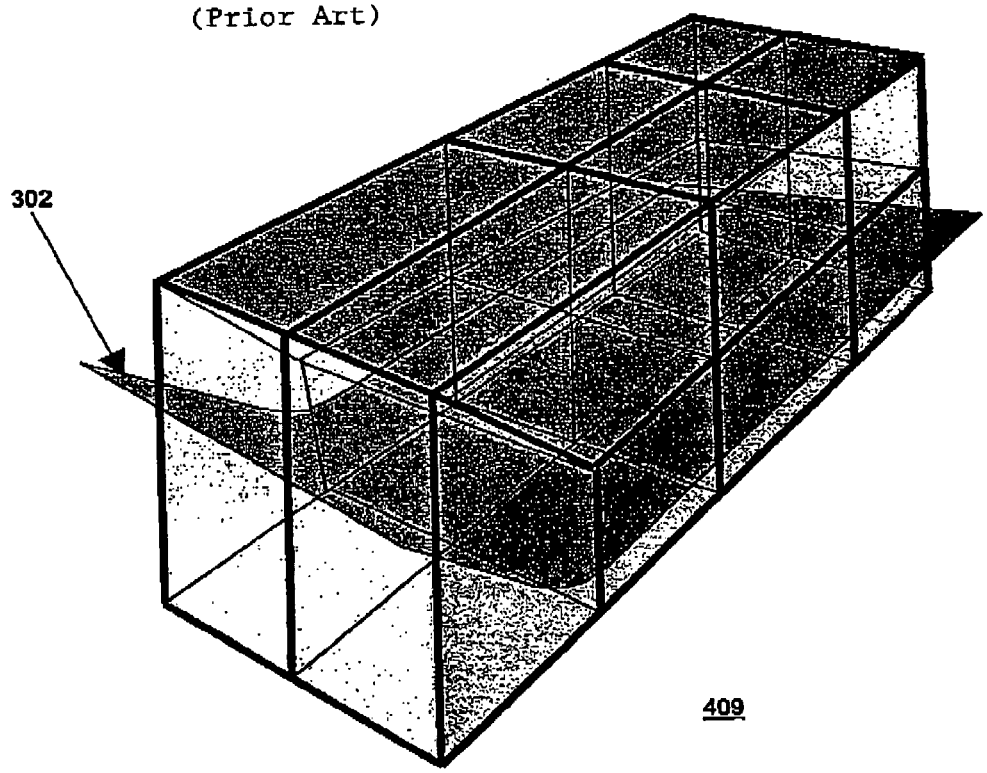
FIG. 3 is a block diagram showing a twist plane found in the prior art.
Figure 4:
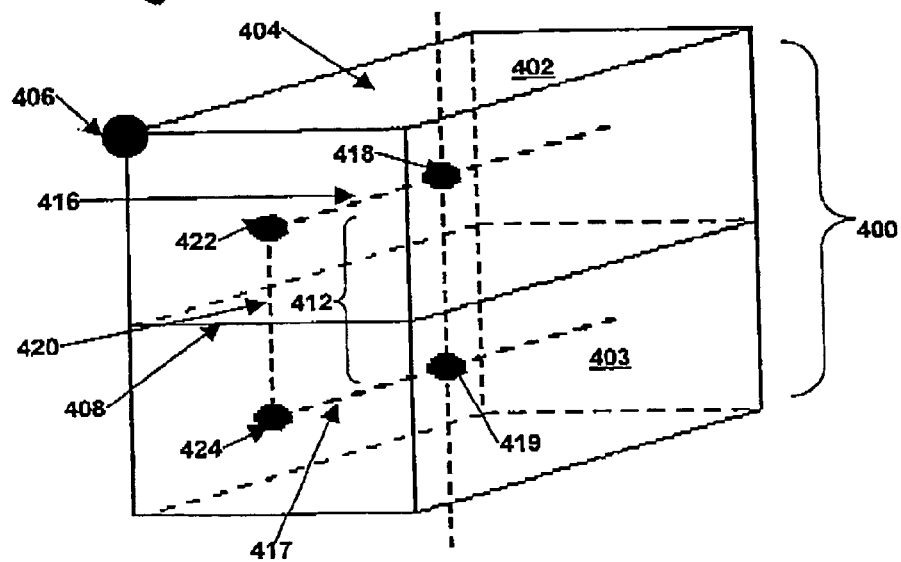
FIG. 4 is a block diagram showing exemplary elements employed in a sheet insertion algorithm in accordance with embodiments of the present invention.

In accordance with embodiments of the present invention, a sheet insertion algorithm may be followed (as executed by a machine-readable medium) to modify a finite element volume mesh using a dual of a volume mesh (e.g., a three-dimensional brick structure). FIG. 4 shows a block diagram including exemplary elements employed in a sheet insertion algorithm in accordance with embodiments of the present invention. A volume mesh 400 may include a stack of hexahedral elements (hexahedrons) 402, 403 where each hexahedral element includes six quadrilateral faces 404 and eight predetermined nodes 406 with each node formed at an intersection of three edges 408. As shown in FIG. 4, a dual 409 of the stack of hexahedral elements 402 may be generated (following the steps of FIG. 1B) using volume chords 416, 417 where an intersection of multiple chords forms volume centroids 418, 419 in the middle of hexahedral elements 402, 403. Advantageously, a twist plane 412, defined to start from mesh edge 408 including chord 420 intersecting surface centroids 422, 424, may be used to represent a sheet of hexahedral elements from dual 409. Surface centroids (the intersection of two or more surface chords) 422, 424 may represent the end points of volume chords 416, 417. Volume chord 416 may be selected as the chord lying within (along an intersecting edge with other twist planes as shown in FIG. 2A) twist plane 412 to define the sheet of hexahedral mesh elements starting with hexahedral element 402.

Figure 5A:
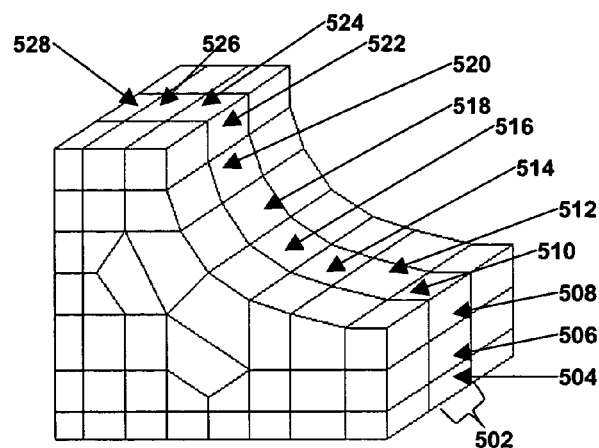
FIG. 5A is a block diagram of an exemplary generated dual showing a sheet of polyhedral elements in accordance with embodiments of the present invention.
Figure 7:
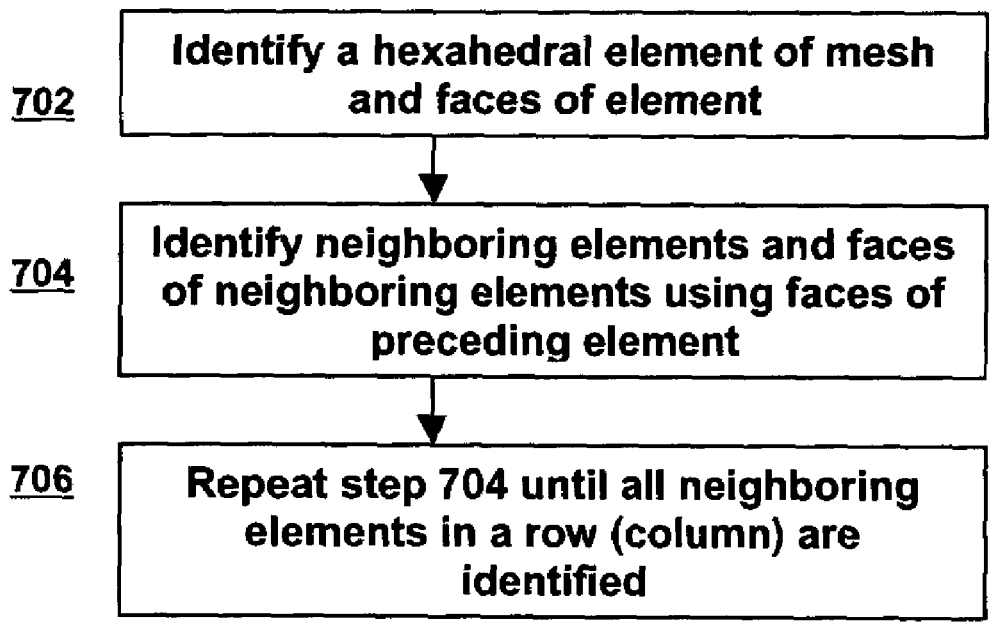
FIG. 7 is a flow process diagram of a sheet identification algorithm to identify a sheet of polyhedral elements within a volume mesh in accordance with embodiments of the present invention.

As shown in FIG. 5A, one or more sheets 502 of hexahedral elements may be generated from volume mesh 500, starting with initial hexahedral element 504, using the flow process of FIG. 7. The flow process uses the condition of mesh configuration that neighboring hexahedral elements may share one face and lining up hexahedral elements up so that each element has two neighboring elements that are attached to opposing faces will generate columns of hexahedral elements. Following the flow process, at step 702 the initial hexahedral element 504 in the sheet 502 is identified along with the faces of element 504. At step 704, neighboring element 506 may be identified using the shared face 508 between initial element 504 and neighboring element 506. At step 706, the step of 704 is continued until all neighboring elements (508, 510, 512, 514, 516, 518, 520, 522, 524, 526, 528) in a column are identified to form one or more sheets 502 of hexahedral elements. Advantageously, one or more sheets 502 may be represented one or more twist planes, each plane located along a volume chord lying within the plane.

Figure 5B:
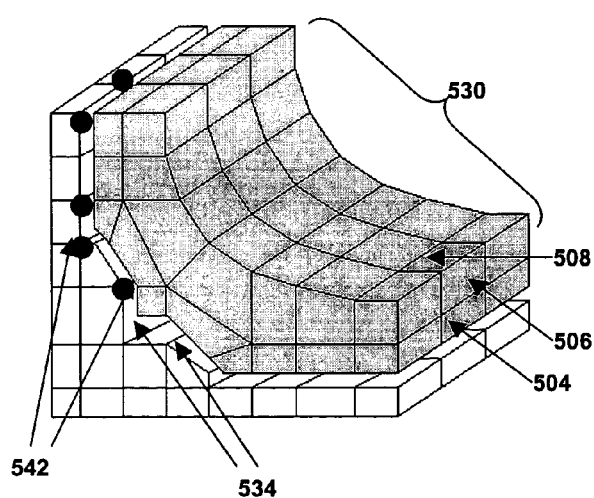
FIG. 5B is a block diagram of an exemplary generated dual showing a group of polyhedral elements to be refined in accordance with embodiments of the present invention.
Figure 5C:
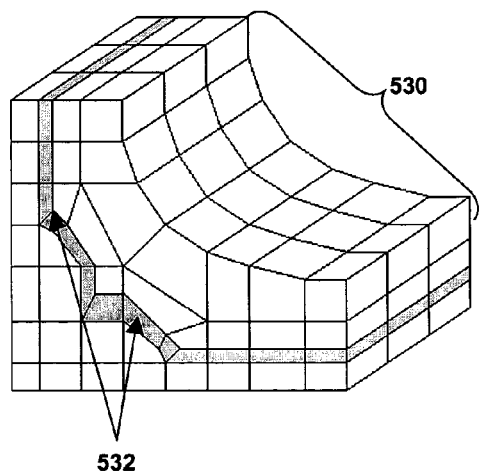
FIG. 5C is a block diagram of an exemplary modified volume mesh from a generated dual after sheet insertion in accordance with embodiments of the present invention
Figure 8:
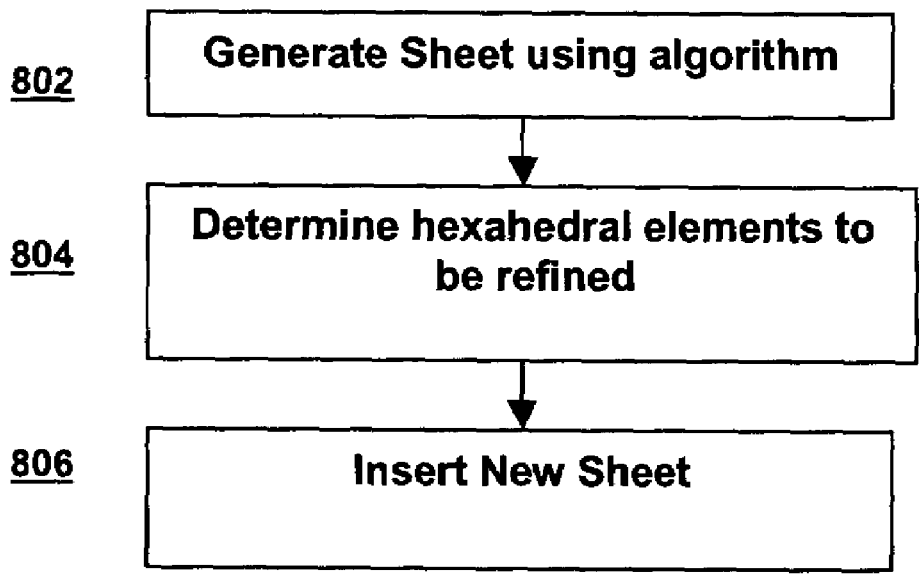
FIG. 8 is a flow process diagram of a sheet insertion algorithm to modify a volume mesh in accordance with embodiments of the present invention.

In accordance with embodiments of the present invention, modification of a volume mesh 500 by sheet insertion (auto refinement) may be performed using the flow process of FIG. 8 as shown in FIGS. 5A–5C. At step 802, one or more sheets 502 of hexahedral elements may be generated (using the flow process of FIG. 7) as shown in FIG. 5A. At step 804, a group of hexahedral elements within one or more sheets 502 to be refined may be determined (defined) as shown by exemplary group 530 (including elements 504, 506, 508, etc.) in FIG. 5B. A predetermined algorithm may be followed to determine the particular group 530 of hexahedral elements to refine within one or more sheets 502. Advantageously, each (hexahedral) element in one or more sheets 502 may be examined during this process. Each element (e.g., 504) of the one or more sheets 502 includes a set of opposing faces (top and bottom faces) that are not shared by any other element in the one or more sheets 502. The distance (d) between these two faces may be determined and recorded for each element in the one or more sheets 502 including recording of the element with the shortest distance between opposing, non-sharing faces. The distance measurement for every other element in the one or more sheets 502 may be compared with the shortest distance to generate a ratio for every other element in the one or more sheets 502. Thereafter, the generated ratio may be compared with a predetermined ratio threshold (e.g., user specified) and all elements with a ratio satisfying this threshold (e.g., equal to or greater) may be placed in the group 530 of hexahedral elements to be refined.

At step 806, after group 530 has been determined, a new sheet 532 of hexahedral elements may be inserted into mesh 500 to produce modified volume mesh 538 as shown in FIG. 5C. Advantageously, new sheet 532 may be inserted using the process of pillowing. The identified group 530 of hexahedral elements to be refined are shrunk (shrink region) wherein the exterior nodes of the shrink region (set) 530 are moved (outwards) while retaining a copy of each in the original position 542. Thereafter, the elements (refinement group) of the shrink region 530 are completely separated from the surrounding mesh 500 by replacing the nodes of the surrounding hexahedral elements that are on the boundary of the shrink set 530 with the corresponding copied nodes at the original position 542. This step forms a void 534 between the replacement, copied nodes in the original position 542 and the actual shrink set 530. Thereafter, new sheet 532 may be inserted to fill void 534 as shown in FIG. 5C.

Advantageously, volume mesh 500 may be initially generated using the sheet generation algorithm of FIG. 7 and step 802 of FIG. 8 to generate a plurality of sheets of hexahedral elements along volume chords and associated twist planes (as shown in FIGS. 4–5). Thereafter, the generated mesh may be modified using further steps of the flow process of FIG. 8 (steps 804, 806) to determine (identify) a group of elements to refine, and insert a new sheet using the pillowing process to generate the modified volume mesh 538 as shown in FIG. 5C.

Figure 6A:
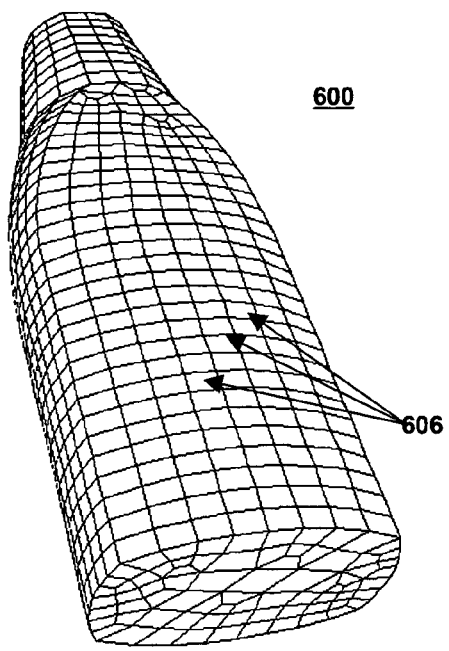
FIG. 6A is a block diagram of an exemplary existing volume mesh in accordance with embodiments of the present invention.
Figure 6B:
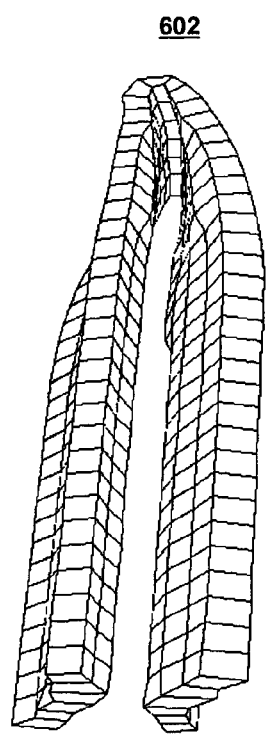
FIG. 6B is a block diagram of an exemplary generated sheet of polyhedral elements to be inserted into a volume mesh in accordance with embodiments of the present invention.
Figure 6C:
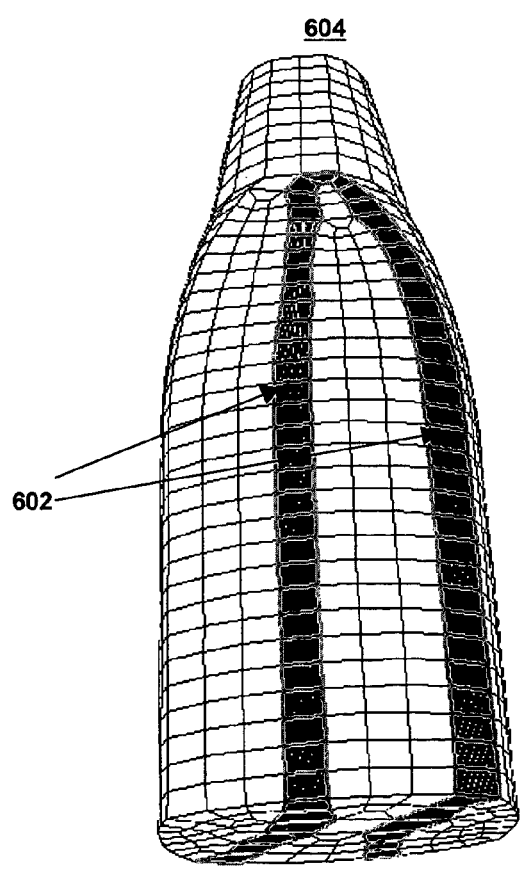
FIG. 6C is a block diagram of an exemplary modified volume mesh after sheet insertion in accordance with embodiments of the present invention.

Additionally, FIGS. 6A–6C show an exemplary modification of a volume mesh 600 using the flow process of FIG. 8 in accordance with embodiments of the present invention. Mesh 600, prior to sheet insertion, is shown in FIG. 6A and a shrink region (group of elements to be refined) 606 including multiple columns of (hexahedral) elements is identified (determined). In FIG. 6B, a new sheet 602 to be inserted is shown, and then in FIG. 6C the modified volume mesh 604 is shown wherein sheet 602 has been inserted to fill a void surrounding the shrink region 606 to produce the modified mesh 604. Sheet 602 maintains the all-hexahedral connectivity of mesh 604 and may be inserted to improve the quality of the mesh by producing a more uniform (geometric complexities resolved) mesh. Advantageously, the process of FIG. 8 may be used for (local) feature refinement of a mesh using a plurality of different elements to identify the shrink region (group of elements to refine) including a surface, line, or point within the mesh.

Figure 9:
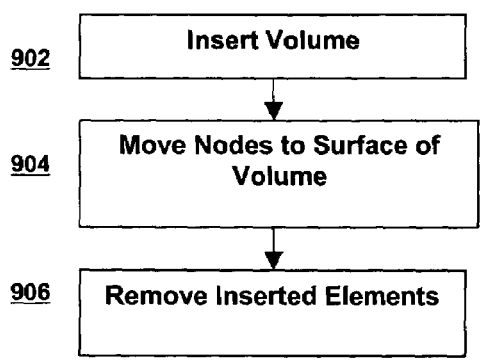
FIG. 9 is a flow process diagram of a mesh cutting algorithm to modify a volume mesh in accordance with embodiments of the present invention.
Figure 10A:
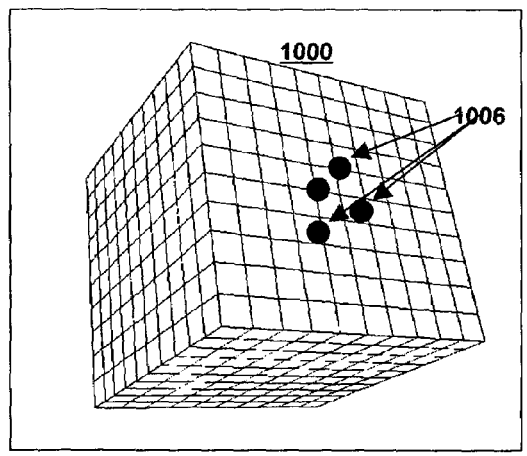
FIG. 10A is a block diagram of an exemplary existing volume mesh in accordance with embodiments of the present invention.
Figure 10B:
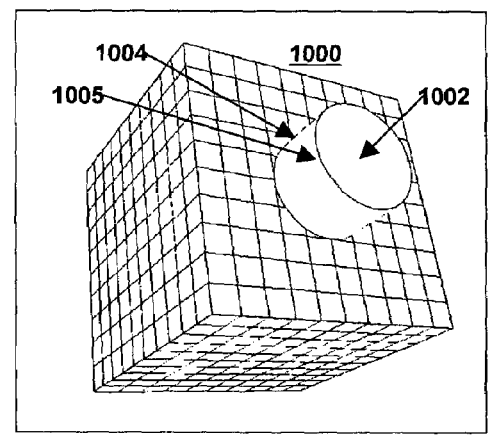
FIG. 10B is a block diagram of an exemplary volume to be inserted into an existing volume mesh in accordance with embodiments of the present invention.

In accordance with embodiments of the present invention, a variation of sheet insertion (mesh cutting) may be performed to modify a volume mesh using the flow process of FIG. 9 as shown in FIGS. 10A–10E. FIG. 10A shows an existing volume mesh 1000 prior to mesh cutting with nodes 1006. At step 902, a (new) volume (e.g., cylinder) 1002 may be inserted into the original mesh 1000 (as shown in FIG. 10B) forming an intersection 1004 at the surface 1005 of the volume 1002 between the surrounding mesh 1000 and the volume 1002.

At step 904, the nodes 1006 of the elements 1008 at the intersection 1004 may be moved from their original position (as shown in FIG. 10A) to the surface 1005 of the volume 1002 (as shown in FIG. 10C). Additionally, new layers of meshed elements 1008 may be added (re-meshing) at the surface 1005 as shown in FIG. 10C. FIG. 10D shows the mesh 1000 with the inserted volume 1002 removed while the elements 1012 from inside volume 1002 remain inserted. Thereafter, at step 906, the inserted elements 1012 (coming from inside volume 1002) are removed to produce modified volume mesh 1014 with cut-out region 1016 as shown in FIG. 10E.

In accordance with embodiments of the present invention, the volume mesh modification algorithm described herein may include a transition path insertion algorithm to insert a new sheet of elements along a transition path (path between linking surfaces of the mesh which may lessen quality of the mesh) of the mesh. Firstly, a transition path may be defined in the mesh by using a shortest weighted path algorithm. The path may be defined by a set of linked nodes that form a line that passes through the volume mesh. The terminating ends of the path are located on the linking surfaces of the volume, and the path may be found using a shortest weighted path algorithm based on a predetermined algorithm (e.g., Dijkstra's algorithm). The distance of the path may be weighted to ensure the following: 1) minimize the number of nodes in the path, 2) keep the path as straight as possible, and 3) keep the path as far from non-terminating linking surfaces as possible. Advantageously, these objects may improve the quality of the resulting mesh by keeping the number of hexahedral elements in the transition to a minimum and allows as much room as possible for the elements in the transition to be smoothed.

Figure 14A:
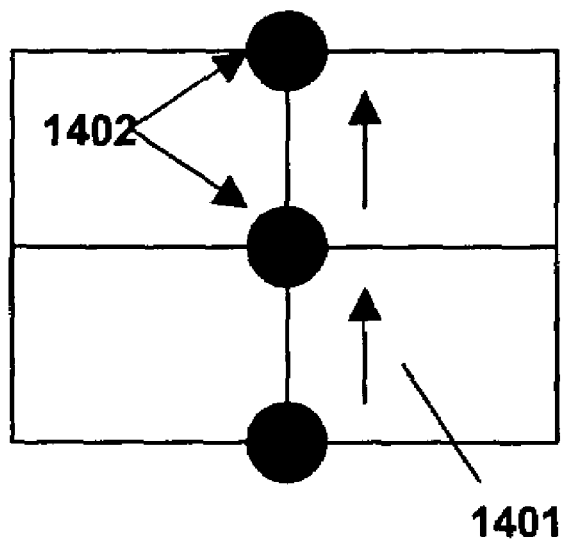
FIGS. 14A–14B are block diagrams showing exemplary transition paths in accordance with embodiments of the present invention.
Figure 14B:
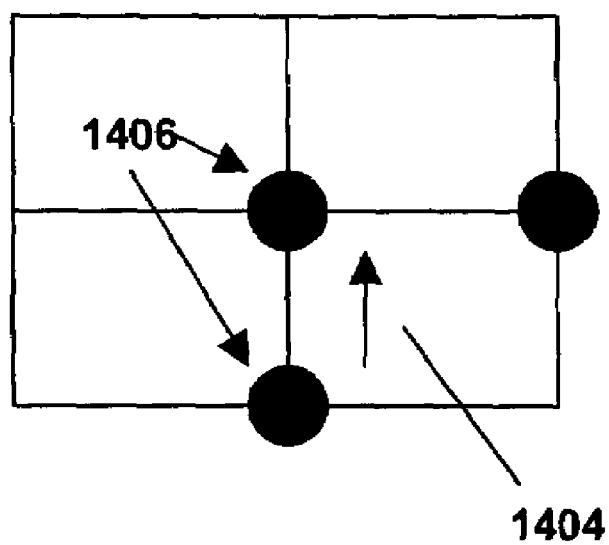

In accordance with the weighted path algorithm, the weighted distance of a node may be defined as $dist=(p+1)+t+(w_{max}-w_{node})$, where dist=weighted distance of the node; p=weighted distance of previous node in the path; t=0 if the node path does not turn, or 1 otherwise; $w_{node}$=weight of node; and $w_{max}$=maximum weight of all nodes Advantageously, the distance a node is from the linking surfaces determines its weight value. A node on a linking surface may be weighted zero and the node furthest from any linking surface may be weighted $w_{max}$. Therefore, the value $(w_{max}-w_{node})$ may be added to the distance to meet the objective of moving the path away from the surfaces. The value t may be determined by the "straightness" of the path. In accordance with embodiments of the present invention, FIG. 14A shows a path (shown by arrows 1401) with consecutive nodes 1402 that do not turn along arrows 1405 and alternatively, FIG. 14B shows a path (shown by arrows 1404) with consecutive nodes 1406 that do turn.

As shown in Appendix C, the shortest weighted path algorithm may include a breadth first search that proceeds through steps 1–9. At step 7, if the search group is empty before the end node is reached then the search group may be disjoint and a path between the start and end nodes cannot be found so the algorithm may return a failure.

Figure 15:
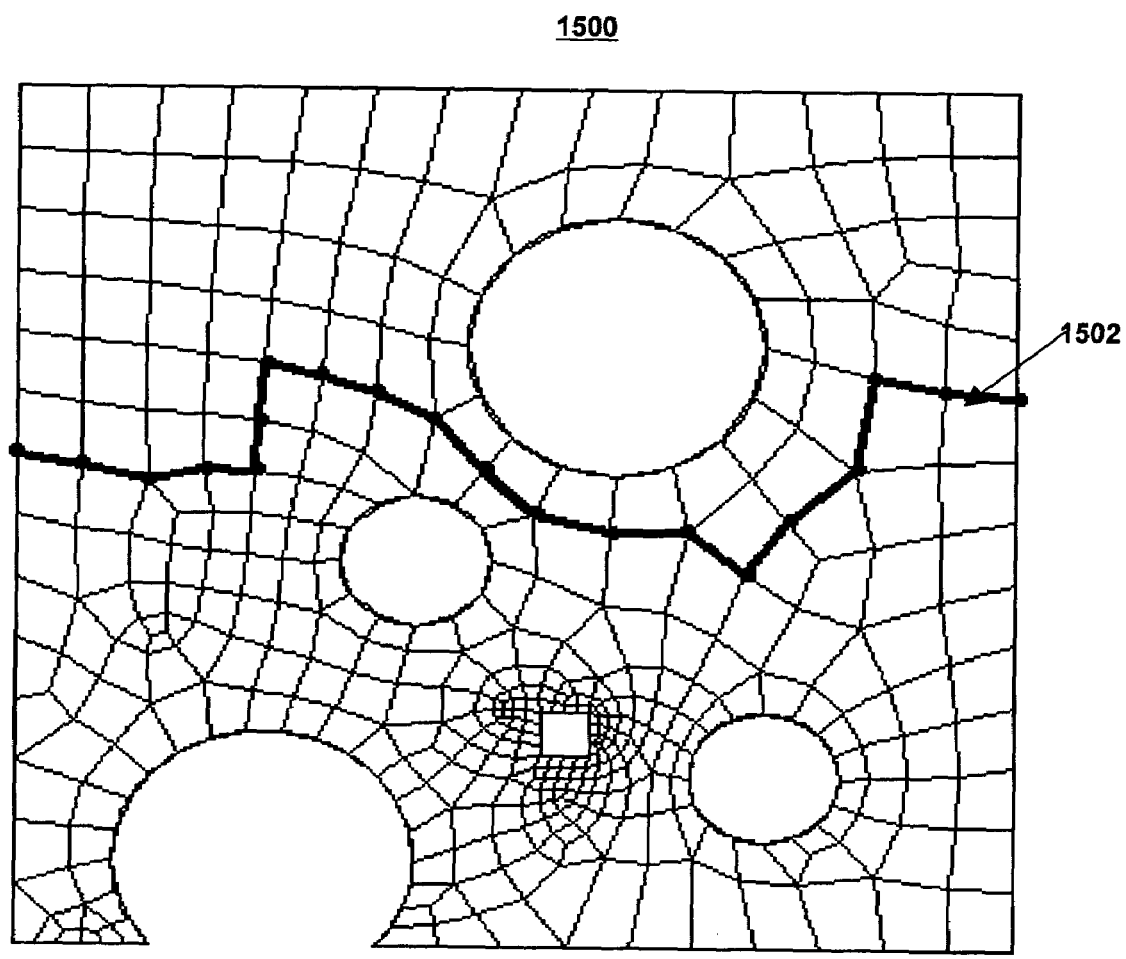
FIG. 15 is a block diagram showing an exemplary transition path of a volume mesh in accordance with embodiments of the present invention.

As the shortest weighted path algorithm in Appendix C is executed, each node that has been visited may hold a pointer to the node immediately before it in the path. Therefore, once the end node may be reached, the path may be found by starting with the end node and following the pointers back to the start node. FIG. 15 shows a transition path 1502 that may found through an existing volume mesh 1500 using the shortest weighted path algorithm of Appendix C in accordance with embodiments of the present invention.

Figure 11:
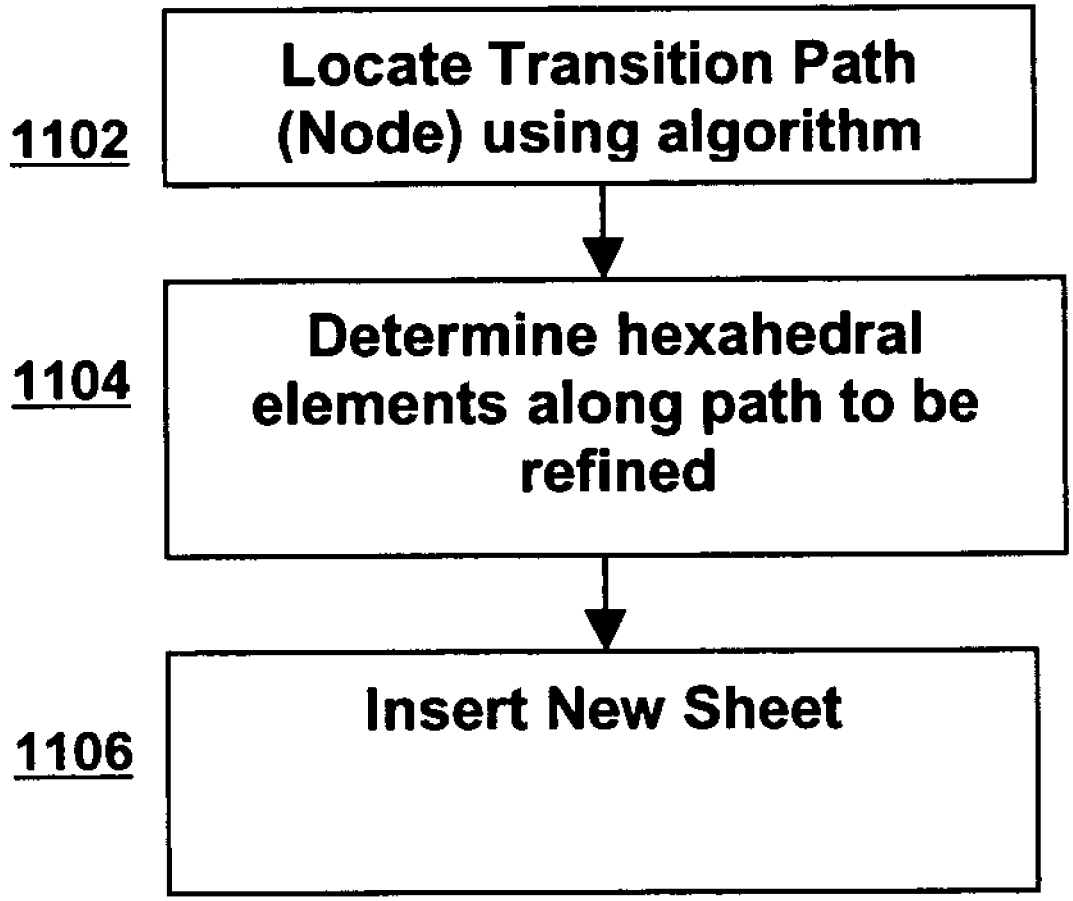
FIG. 11 is a flow process diagram of a transition path insertion algorithm to modify a volume mesh in accordance with embodiments of the present invention.
Figure 12A:
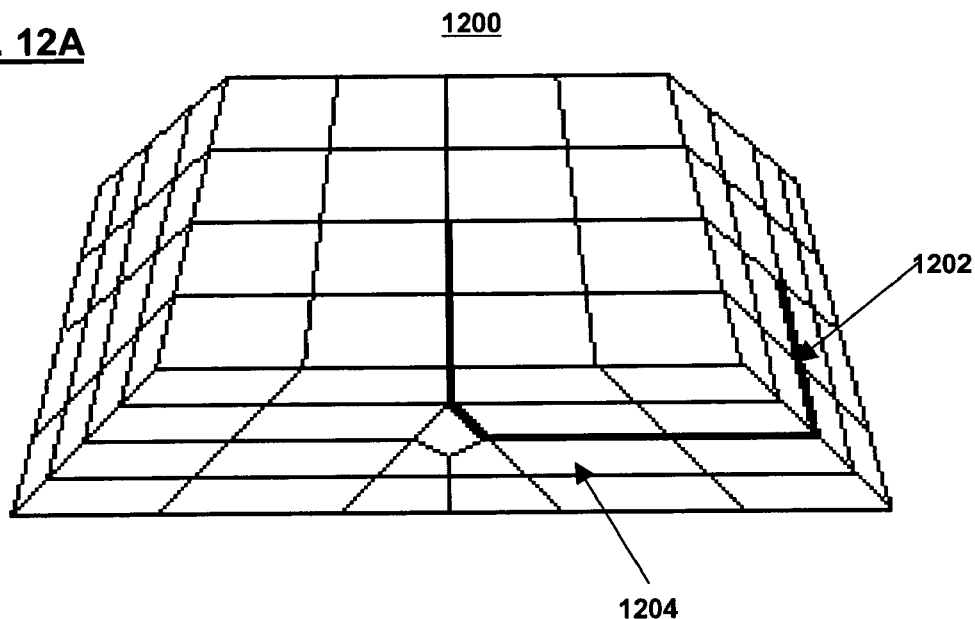
Figure 12B:
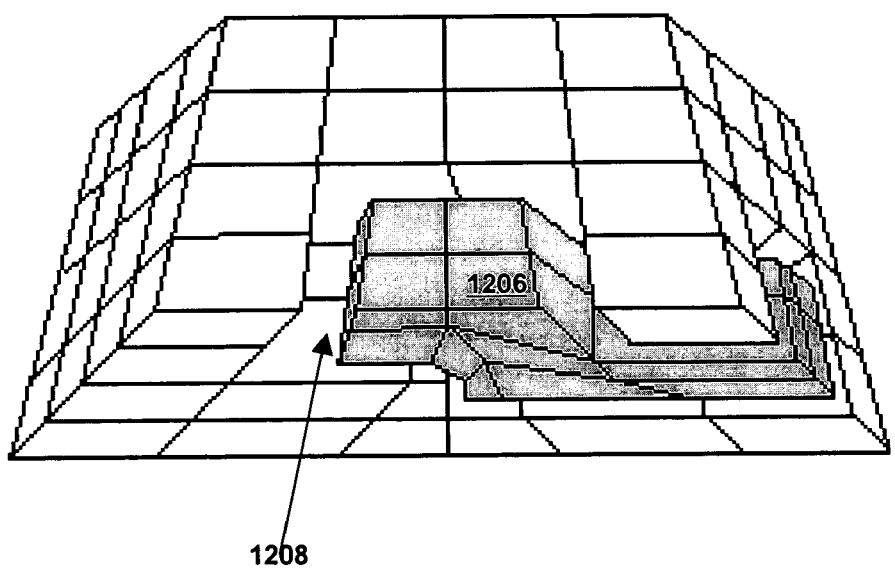

Once the transition path is found (determined), the path may be projected through the volume mesh until a target surface is reached. FIGS. 12A–12C are block diagrams showing exemplary performance of transition path extraction and FIG. 11 shows a flow process diagram of transition path insertion in accordance with embodiments of the present invention. At step 1102, the transition path may be found (determined) using the shortest weighted path algorithm of Appendix D. As shown in FIG. 12A, a transition path may be found and then projected through an exemplary volume mesh 1200 to form a sheet 1202 of nodes on a target surface 1204 that may be used to define a shrink region.

At step 1104, the shrink region of hexahedral elements may be determined as the elements 1206 having a face lying on the sheet as shown in FIG. 12B. After the shrink region 1206 of elements are determined from sheet 1202, a void 1208 may be formed using the pillowing process described herein. FIG. 12B shows the determined shrink region 1206 of elements and void 1208 formed within volume mesh 1200. Thereafter, at step node 1106, a (new) sheet 1210 of hexahedral elements may be inserted to fill void 1208 and produce modified volume mesh 1212. Sheet (transition elements inserted) 1210 may include multiple valent nodes (nodes leading to lower quality of mesh) whose presence is minimized by the objectives of the shortest weighted path algorithm followed in Appendix C.

As described herein, the volume mesh modification algorithms (including sheet and transition path extraction) described herein may be performed by a computer system using a machine-readable medium. FIG. 13 is a block diagram of an exemplary system performing dual generation in accordance with embodiments of the present invention. System 1300 includes an input device 1302, processing device 1304, display 1306, and storage media 1308. Advantageously, processing device 1304 may automatically execute the volume modification algorithm (including sheet insertion, mesh cutting, and/or transition path refinement as shown in FIGS. 8–9, 11) by retrieving a volume mesh from storage media 1308, and display the resulting mesh on display 1306. Alternatively, one or more of the individual steps of the volume mesh modification algorithm may be performed in response to commands received via input device 1302.

A plurality of advantages may be provided in accordance with embodiments of the present invention including a volume mesh modification method (including sheet insertion, mesh cutting, and transition path insertion) that allows mesh elements (e.g., hexahedrons) to be modified without regard to neighboring elements enabling independent editing of mesh elements. Additionally the volume mesh modification algorithm enables generation of a high-quality resulting mesh by recognizing global connectivity information (e.g., local self-intersections and self-tangencies of twist planes—volume chords) regarding the mesh.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. A method for modifying a hexahedral volume mesh, comprising:

generating a sheet of hexahedral elements from a hexahedral volume mesh, wherein said mesh includes a plurality of three-dimensional (3D) hexahedrons each having six quadrilateral faces, wherein the six quadrilateral faces for each 3D hexahedron include three sets of opposing faces, and eight nodes, each node formed at three intersecting edges, and wherein said sheet includes a subset of the plurality of 3D hexahedrons, wherein generating a sheet includes:
  a) selecting a first hexahedron, the selected hexahedron having a first set of opposing faces, the first set including a first opposing face and a second opposing face;
  b) determining a first neighboring hexahedron, the first neighboring hexahedron sharing the first opposing face with the selected hexahedron;
  c) selecting the first neighboring hexahedron, the first neighboring hexahedron having another face opposite the shared first opposing face;
  d) repeating steps b) and c) until a predetermined sheet edge threshold being satisfied;
  e) determining a second neighboring hexahedron, the second neighboring hexahedron sharing the second opposing face with the selected hexahedron;
  f) selecting the second neighboring hexahedron, the second neighboring hexahedron having another face opposite the shared second opposing face;
  g) repeating steps e) and f) until the sheet edge threshold being satisfied;
  h) grouping all selected hexahedrons into a first column of hexahedrons;
  i) selecting the first hexahedron, the selected hexahedron having a second set of opposing faces, the second set including a third opposing face and a fourth opposing face;
  j) determining a third neighboring hexahedron, the third neighboring hexahedron sharing the third opposing face with the selected hexahedron;
  k) selecting the third neighboring hexahedron;
  l) repeating steps a) through h) until a second column of hexahedron is grouped;
  m) selecting the first hexahedron;
  n) determining a fourth neighboring hexahedron, the fourth neighboring hexahedron sharing the fourth opposing face with the selected hexahedron;
  o) selecting the fourth neighboring hexahedron;
  p) repeating steps a) through h) until a third column of hexahedrons is grouped;
  q) repeating steps a) through p) until the sheet edge threshold being satisfied; and
  r) grouping all columns of hexahedrons into the sheet;
determining a group of hexahedrons within said sheet to refine;
shrinking said group; and inserting a new sheet of hexahedrons into the hexahedral volume mesh.

2. The method of claim 1, wherein generating a sheet includes:
   a) selecting a hexahedron, the selected hexahedron having three sets of opposing faces from the six quadrilateral faces, each set including a first opposing face and a second opposing face;
   b) determining a neighboring hexahedron to refine, the neighboring hexahedron sharing one face with the selected hexahedron;
   c) repeating step b) until all neighboring hexahedrons have been found;
   d) selecting the neighboring hexahedron to refine;
   e) repeating steps a) through d until all hexahedrons in the sheet have been found.

3. The method of claim 1, wherein determining a group of hexahedrons includes identifying said group using one of a point, line, and surface of the mesh.

4. The method of claim 1, wherein determining a group of hexahedrons within said sheet to refine includes:
   a) selecting a hexahedron in the group to refine, the selected hexahedron having three sets of opposing faces from the six quadrilateral faces, each set comprising a first opposing face and a second opposing face;
   b) identifying the one set of opposing faces that are not shared by another hexahedron in the sheet, the set including a first unshared opposing face and a second unshared opposing face;
   c) determining a distance between the first unshared opposing face and the second unshared opposing face;
   d) repeating steps a) through c) for each hexahedron in the group to refine;
   e) comparing the distance for each hexahedron in the group to refine;
   f) determining the hexahedron with a shortest distance;
   g) calculating a ratio of the distance for each hexahedron in the sheet to refine to the shortest distance;
   h) comparing the ratio to a refinement threshold;
   i) grouping each hexahedron identified to refine into the group; and
   j) repeating steps g) through i) for each hexahedral in the group to refine.

5. The method of claim 1, wherein shrinking said group includes:
   moving exterior nodes of the group from an original position into the volume of each hexahedron; and maintaining a copy of each exterior node in the original position.

6. The method of claim 1, wherein shrinking said group includes pillowing.

7. The method of claim 1, wherein inserting a new sheet of hexahedrons into the hexahedral volume mesh includes:
   separating each hexahedron in the group from the hexahedral volume mesh;
   forming a void in the hexahedral volume mesh; and
   inserting the new sheet of hexahedrons into the void.

8. A method for generating a hexahedral volume mesh by inserting a sheet of hexahedrons, comprising:
   generating an initial hexahedral volume mesh, wherein the mesh includes a plurality of three-dimensional (3D) hexahedrons, each 3D hexahedron having six quadrilateral faces and nodes, each node formed at three intersecting edges,
   determining an area to refine in the initial mesh;
   generating a sheet from said area, wherein the sheet includes a subset of the plurality of 3D hexahedrons, wherein generating a sheet includes:
   a) selecting a first hexahedron, the selected hexahedron having a first set of opposing faces, the first set comprising a first opposing face and a second opposing face;
   b) determining a first neighboring hexahedron, the first neighboring hexahedron sharing the first opposing face with the selected hexahedron;
   c) selecting the first neighboring hexahedron, the first neighboring hexahedron having another face opposite the shared first opposing face;
   d) repeating steps b) and c) until a sheet edge threshold being satisfied;
   e) determining a second neighboring hexahedron, the second neighboring second opposing face with the selected hexahedron;
   f) selecting the second neighboring hexahedron, the second neighboring hexahedron having another face opposite the shared second opposing face;
   g) repeating steps e) and f) until a sheet edge threshold being satisfied;
   h) grouping all selected hexahedrons into a first column of hexahedrons;
   i) selecting the first hexahedron, the selected hexahedron having a second set of opposing faces, the second set comprising a third opposing face and a fourth opposing face;
   j) determining a third neighboring hexahedron, the third neighboring hexahedron sharing the third opposing face with the selected hexahedron;
   k) selecting the third neighboring hexahedron;
   l) repeating steps a) through h) until a second column of hexahedrons is grouped;
   m) selecting the first hexahedron;
   n) determining a fourth neighboring hexahedron, the fourth neighboring hexahedron sharing the fourth opposing face with the selected hexahedron;
   o) selecting the fourth neighboring hexahedron to refine;
   p) repeating steps a) through h) until a third column of hexahedrons is grouped;
   q) repeating steps a) through p) until the sheet edge criterion is met; and
   r) grouping all columns of hexahedrons into the sheet;
   defining a group of hexahedrons within said sheet to refine;
   shrinking said group; and
   inserting a new sheet of hexahedrons into the hexahedral volume mesh.

9. The method of claim 8, wherein generating a sheet includes:
   a) selecting a hexahedron, the selected hexahedron having three sets of opposing faces from the six quadrilateral faces, each set including a first opposing face and a second opposing face;
   b) determining a neighboring hexahedron, the neighboring hexahedron sharing one face with the selected hexahedron;
   c) repeating step b) until all neighboring hexahedrons have been found;
   d) selecting the neighboring hexahedron;
   e) repeating steps a) through d) until all hexahedrons in the sheet have been found.

10. The method of claim 8, wherein determining a group of hexahedrons within said sheet to refine includes:
  a) selecting a hexahedron in the group to refine, the selected hexahedron having three sets of opposing faces from the six quadrilateral faces, each set comprising a first opposing face and a second opposing face;
  b) identifying the one set of opposing faces that are not shared by another hexahedron in the sheet, the set comprising a first unshared opposing face and a second unshared opposing face;
  c) determining a distance between the first unshared opposing face and the second unshared opposing face;
  d) repeating steps a) through c) for each hexahedron in the group to refine;
  e) comparing the distance for each hexahedron in the group to refine;
  f) determining a hexahedron with a shortest distance;
  g) calculating a ratio of the distance for each hexahedron in the group to refine to the shortest distance;
  h) comparing the ratio to a refinement threshold;
  i) grouping each hexahedron identified to refine into the group; and
  j) repeating steps g) through i) for each hexahedral in the group to refine.

11. The method of claim 8, wherein shrinking said group includes:
  moving exterior nodes of the group from an original position into the volume of each hexahedron; and
  maintaining a copy of each exterior node in the original position.

12. The method of claim 8, wherein shrinking said group includes pillowing.

13. The method of claim 8, wherein inserting a new sheet of hexahedrons into the hexahedral volume mesh includes:
  separating each hexahedron in the group from the hexahedral volume mesh;
  forming a void in the hexahedral volume mesh; and
  inserting the new sheet of hexahedrons into the void.

14. The method of claim 8, wherein generating a sheet includes using a dual of the initial hexahedral mesh.

15. The method of claim 8, wherein determining an area to refine includes identifying said area using one of a point, line, and surface of the mesh.

16. The method of claim 8, wherein the initial hexahedral mesh is selected from the group consisting of an all-hexahedral swept mesh, multiple all-hexahedral swept meshes for a subdivided geometric entity, a quadrilateral mesh from a source surface to a target surface, and combinations thereof.

17. A sheet insertor for modifying a hexahedral mesh, comprising:
  a controller for performing the steps of:
    generating a sheet of hexahedrons from a hexahedral mesh, wherein the mesh includes a plurality of 3D hexahedrons, and wherein said sheet including a subset of the plurality of 3D hexahedrons:
      determining a group of hexahedrons within said sheet to refine, wherein determining a group of hexahedrons within said sheet to refine includes:
        determining a plurality of hexahedrons in the group to refine;
        determining a hexahedron with the shortest distance;
        determining a ratio of the distance for each hexahedron in the group to the shortest distance; and
        comparing the ratio with a refinement threshold;
      separating each hexahedron in the group from the hexahedral volume mesh to form a void; and
      inserting a new sheet of hexahedrons into the void.

18. The sheet insertor of claim 17, wherein determining a group of hexahedrons includes identifying said group using one a point, line, and surface of the mesh.

19. The sheet insertor of claim 17, wherein said controller further performing the steps of:
  selecting a hexahedron, including three sets of opposing faces, wherein each set includes a first opposing face and a second opposing face;
  selecting a neighboring hexahedron, including three sets of opposing faces, the neighboring hexahedron sharing one face with the selected hexahedron; and
  selecting a plurality of other neighboring hexahedrons, each neighboring hexahedron comprising three sets of opposing faces, each neighboring hexahedron sharing a face another hexahedron.

20. A method for modifying a hexahedral volume mesh, comprising:
  inserting a volume into a hexahedral volume mesh forming an intersection, wherein the mesh includes a plurality of 3D hexahedrons, each 3D hexahedron having eight nodes, each node formed at three intersecting edges;
  moving nodes in the hexahedral mesh to surface of intersection with the volume;
  inserting a layer of elements on each side of the volume; and
  removing the volume.

21. A method for generating a hexahedral volume mesh by mesh cutting, comprising:
  generating an initial hexahedral mesh including a plurality of 3D hexahedrons, each hexahedron having a plurality of nodes;
  inserting a volume into the initial hexahedral mesh forming an intersection;
  moving nodes in the hexahedral mesh to surface of intersection with the volume;
  inserting a layer of elements on each side of the volume; and
  removing the volume.

22. A mesh cutter for cutting a hexahedral volume mesh, comprising:
  a controller for performing the steps of:
    generating an initial hexahedral mesh including a plurality of 3D hexahedrons, each hexahedron having a plurality of nodes;
    inserting a volume into the initial hexahedral mesh forming an intersecting having a surface; and
    inserting a layer of elements on each side of the volume.

23. A method for modifying a volume mesh, comprising:
  connecting a plurality of rows of elements of a volume mesh using connecting lines, where said connecting lines, together with associated planes, form a plurality of three-dimensional regions, said plurality of three-dimensional regions forming a sheet of volume mesh elements from said mesh;
  determining a plurality of hexahedral elements within said sheet to refine using a predetermined threshold for each one of said plurality;
  forming a void between said plurality of hexahedral elements and said mesh;
  inserting a new sheet of hexahedral elements into said void to produce a modified form of said volume mesh.

24. A machine-readable medium having stored thereon a plurality of executable instructions, the plurality of instructions comprising instructions to:
connect a plurality of rows of elements of a volume mesh using connecting lines, where said connecting lines, together with associated planes, form a plurality of three-dimensional regions, said plurality of three-dimensional regions for a sheet of volume mesh elements from said mesh;
determine a plurality of hexahedral elements within said sheet to refine using a predetermined threshold for each one of said plurality;
form a void between said plurality of hexahedral elements and said mesh;
insert a new sheet of hexahedral elements into said void to produce a volume mesh.

25. A method for modifying a volume mesh, comprising:
connecting a plurality of rows of elements of a volume mesh using connecting lines, where said connecting lines, together with associated planes, form a plurality of three-dimensional regions, said plurality of three-dimensional regions forming a sheet of volume mesh elements, each mesh element including a plurality of surfaces;
determining at least one node linking a plurality of surfaces in said sheet using a predetermined algorithm;
disconnecting a plurality of said connecting lines, together with a plurality of said associated planes, at said at least one node and removing a portion of said plurality of connecting lines, together with a portion of said plurality of associated planes, in a predetermined direction away from said point to form a void in said mesh;
inserting a new sheet of hexahedral elements into said void to produce a modified form of said volume mesh.

26. A machine-readable medium having stored thereon a plurality of executable instructions, the plurality of instructions comprising instructions to:
connect a plurality of rows of elements of a volume mesh using connecting lines, where said connecting lines, together with associated planes, form a plurality of three-dimensional regions, said plurality of three-dimensional regions forming a sheet of volume mesh elements, each mesh element including a plurality of surfaces;
determine at least one node linking a plurality of surfaces in said sheet using a predetermined algorithm;
disconnect a portion of said connecting lines, together with a portion of said associated planes, at said at least one node and removing said portion in a predetermined direction away from said point to form a void in said mesh;
insert a new sheet of hexahedral elements into said void to produce a modified form of said volume mesh.

27. A method for modifying a volume mesh, comprising:
connecting a plurality of rows of elements of a volume mesh using connecting lines, where said connecting lines, together with associated planes, form a plurality of three-dimensional regions, said plurality of three-dimensional regions forming a sheet of volume mesh elements from said mesh;
inserting a volume including elements within said volume into said mesh at the sheet forming an intersection having a surface between said volume and the mesh;
associating nodes at said surface including adding a plurality of layers to existing mesh elements at the surface;
removing said volume including the elements within said volume to produce a modified form of said volume mesh.

28. A machine-readable medium having stored thereon a plurality of executable instructions, the plurality of instructions comprising instructions to:
connect a plurality of rows of elements of a volume mesh using connecting lines, where said connecting lines, together with associated planes, form a plurality of three-dimensional regions, said plurality of three-dimensional regions forming a sheet of volume mesh elements from said mesh;
insert a volume including elements within said volume into said mesh at the sheet forming an intersection having a surface between said volume and the mesh;
associate nodes at said surface including adding a plurality of layers to existing, mesh elements at the surface;
remove said volume including the elements within said volume to produce a modified form of said volume mesh.

* * * * *